United States Patent
Conrad et al.

(10) Patent No.: US 7,876,864 B2
(45) Date of Patent: Jan. 25, 2011

(54) METHOD AND DEVICE FOR ENHANCING SIGNAL DETECTION IN A FREQUENCY SELECTIVE FADING CHANNEL

(75) Inventors: Alan P. Conrad, St. Charles, IL (US); Kevin G. Doberstein, Elmhurst, IL (US)

(73) Assignee: Motorola, Inc., Schaumburg, IL (US)

( * ) Notice: Subject to any disclaimer, the term of this patent is extended or adjusted under 35 U.S.C. 154(b) by 896 days.

(21) Appl. No.: 11/743,848

(22) Filed: May 3, 2007

(65) Prior Publication Data
US 2008/0273633 A1    Nov. 6, 2008

(51) Int. Cl.
*H04L 27/06* (2006.01)
(52) U.S. Cl. ...................................... 375/343
(58) Field of Classification Search ................ 375/343, 375/316, 350, 260, 130, 148; 435/5, 6; 342/92
See application file for complete search history.

(56) References Cited

U.S. PATENT DOCUMENTS 6,480,528 B1 *   11/2002   Patel et al. ................... 375/148
2006/0126753 A1 *   6/2006   Jwa et al. ..................... 375/267
2006/0274844 A1 *  12/2006   Walton et al. ................ 375/260
2008/0079634 A1 *   4/2008   Nakamura ................... 342/368

OTHER PUBLICATIONS

Sklar, B., "Rayleigh Fading Channels in Mobile Digital Communication Systems Part 1: Characterization", IEEE Communications Magazine, Sep. 1997, p. 136-146.

* cited by examiner

*Primary Examiner*—Khai Tran
(74) *Attorney, Agent, or Firm*—Terri S. Hughes; Valerie M. Davis

(57) ABSTRACT

A method and system are provided for enhanced signal detection in a frequency selective fading channel. Improved signal detection is realized by replacing single matched filters with multiple matched filters. The single matched filter spectrum is partitioned by frequency into M matched filter groups, where M is a positive integer greater than one. The filter bandwidth of each of the M matched filters is less than the bandwidth of the single matched filter from which they are derived. The M matched filters are provided to filter in parallel fashion the input signal into M sub-spectrums of the signal. The input signal is filtered through the M matched filters and also sent to the energy detector. The matched filter outputs are combined and the received signal is detected using the combined output and the energy in the received signal.

16 Claims, 3 Drawing Sheets

METHOD AND DEVICE FOR ENHANCING SIGNAL DETECTION IN A FREQUENCY SELECTIVE FADING CHANNEL

FIELD OF THE INVENTION

The present disclosure relates generally to two-way radio communications utilizing multi-carrier modulation communication systems, and more particularly to a method and device for enhancing signal detection in a frequency selective fading channel.

BACKGROUND

Fading is a common problem in two-way radio communications. Two types of fading affect mobile communications channels, namely, large scale and small scale fading. Large scale fading represents the average signal power attenuation due to travel over a large area and is affected by terrain, buildings, and other obstacles. Small scale fading manifests itself as time spreading of the signal (signal dispersion) and time variant performance of the channel. For mobile radio applications, the channel is time variant due to the changing of position between the receiver and transmitter. Frequency selective fading arises due to time-dispersion in the multipath channel, such as a wireless cellular channel. This type of fading causes irreducible errors unless the effects of frequency selective fading can be minimized.

Reliable signal detection in a frequency selective fading channel becomes difficult as channel filtering distorts the transmitted waveform. Strong coding techniques, like turbo codes and soft decision viterbi decoding, mitigate the affects of fading and improves decoding at low signal strengths. As a result, the limiting factor in error rate performance is the ability to detect the presence of the received signal in fading. Missed detections lead to irreducible error rate floors and a decrease in throughput.

An optimal signal detection method utilizes a matched filter since this type of filter works to maximize received signal-to-noise ratio. In the prior art, the use of a matched filter to search for a known time domain waveform is a well-known signal detection method. A detection is determined if the magnitude squared of the matched filter output rises above a predetermined threshold. This scheme generally results in good detection performance in an Additive White Gaussian Noise (AWGN) channel. However, in a channel exhibiting frequency selective fading, the channel can distort several frequency components of the received signal. This results in low matched filter outputs, thus degrading detection performance and leading to a greater likelihood of missed detections.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Features of the present disclosure are set forth in the drawings and more particularly in the appended claims. The disclosure, may be best understood with reference to the following description. The disclosure, however, is not limited to the precise arrangement shown in the drawings.

Figure 1:
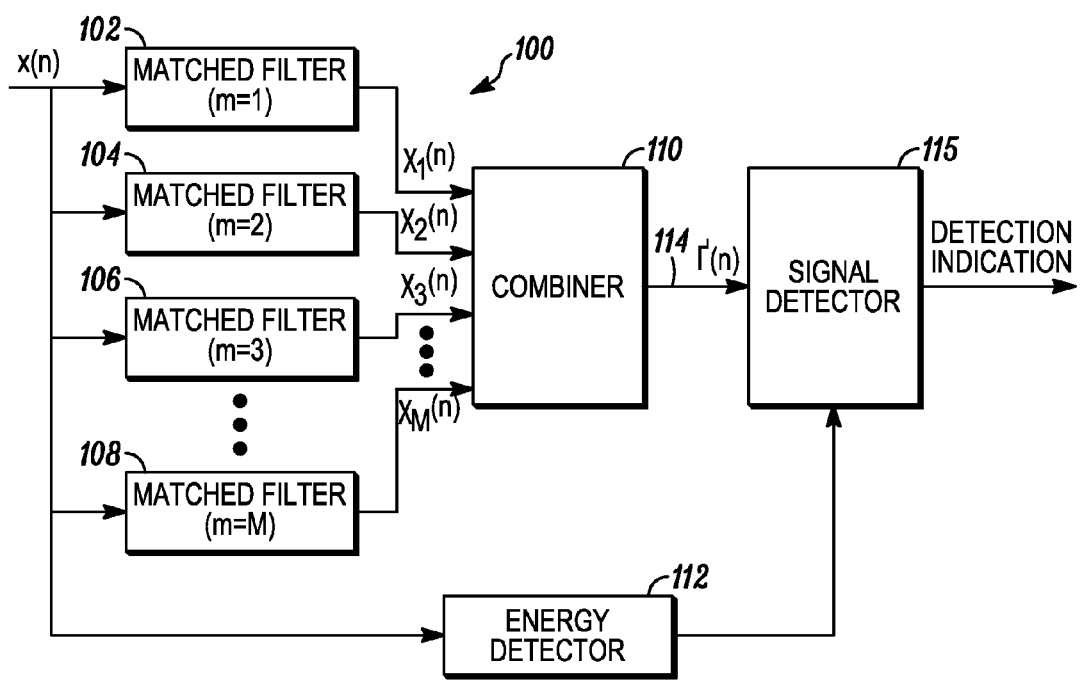
FIG. 1 is a block diagram of a system for improving signal detection in a frequency selective fading channel in a receiver in accordance with an embodiment of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION

Before describing in detail embodiments that are in accordance with the present disclosure, it should be observed that the embodiments reside primarily in combinations of method steps and system components related to a method and a device for enhancing signal detection in a frequency selective fading channel. Accordingly, the system components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In this disclosure, relational terms such as first and second, top and bottom, and the like may be used solely to distinguish one entity or action from another entity or action without necessarily requiring or implying any actual relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

It will be appreciated that embodiments of the disclosure described herein may be comprised of one or more conventional processors and unique stored program instructions that control the one or more processors to implement, in conjunction with certain non-processor circuits, some, most, or all of the functions of a system and method for enhancing signal detection in a frequency selective fading channel as described herein. The non-processor circuits may include, but are not limited to, a radio receiver, a radio transmitter, signal drivers, clock circuits, power source circuits, and user input devices. As such, these functions may be interpreted as steps of a method to perform a system and method for enhancing signal detection in a frequency selective fading channel. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

While the specification concludes with claims defining the features of the disclosure regarded as novel, it is believed that the disclosure will be better understood from a consideration of the following description in conjunction with the drawing figures, in which like reference numerals are carried forward.

The disclosure as described herein comprises a receiver in multi-carrier communications with a transmitter where the receiver comprises a plurality of matched filters each having a bandwidth. The bandwidth of each of the matched filters is based on a bandwidth known a priori (e.g., the bandwidth known a priori may be substantially equivalent to a bandwidth of the channel, a bandwidth of a known signal, a bandwidth of a transmitted signal, or the like). In some embodiments, the bandwidth of each of the matched filters is substantially of equal value, whereas in other embodiments, the bandwidth of each of the matched filters differs. Each of the plurality of matched filters responds to a unique portion of the bandwidth known a priori where the bandwidth of each matched filter is less than the bandwidth known a priori and each of the bandwidths of the matched filters are aggregated to substantially equal and span the frequency spectrum of the bandwidth known a priori (i.e., each filter partitioning the spectrum into unique sub-spectrums). The plurality of matched filters filter a received signal (e.g., a received multi-carrier radio frequency signal) such that each matched filter substantially attenuates portions of the received signal that fall outside of its respective bandwidth. The receiver further comprises a processor or other suitable means for calculating an output of each of the matched filters to detect the received signal. In one embodiment, the receiver can further comprise a combiner for summing the outputs of the matched filters to achieve a combined output.

In the prior art, the use of a single matched filter occupying the entire signal bandwidth is the technique typically used for signal detection. A limitation to this process arises when the single matched filter is applied to a channel exhibiting frequency selective fading. Those skilled in the art will recognize that frequency selective fading both attenuates and intensifies signal power over portions of the signal bandwidth. These bandwidth dependent changes in signal power tend to degrade the matched filter output. Thus, the present disclosure minimizes the effects of frequency selective fading on the signal detection through the use of multiple matched filters that act to filter the signal. The bandwidth of each of the multiple matched filters is less than the bandwidth of the single matched filter from which they are derived. Hence, the multiple matched filters are each responsive to a sub-spectrum of the signal. When viewed in combination, the matched filter sub-spectrums act to substantially cover the spectrum of the received signal.

The present disclosure enhances the detection of a received signal in a frequency selective channel by the use of multiple matched filters. These filters can be applied to high-speed data products on multi-carrier modulation communication systems operating at, for example, 50 KHz, 100 KHz and 150KHz bandwidths as well as broadband mobile cellular products. Those skilled in the art will further recognize that the disclosure may be used without limitation in other applications. Let us now refer to the figures and describe the present disclosure in greater detail.

Referring now to FIG. 1, the device for enhancing the detection of a received signal in a frequency selective fading channel 100 includes 'M' matched filters 102, 104, 106, 108, where M is a positive integer greater than 1. The example illustrated in FIG. 1 uses at least four matched filters. Another embodiment of the present disclosure, however, may use two or more matched filters having sub-spectrums which, when taken in combination, span the assumed signal spectrum. The matched filters 102, 104, 106, 108 are derived from the original single matched filter as used in the known art (not shown) but are designed to each have a bandwidth that is less than the assumed bandwidth of the channel. Each of the matched filters 102, 104, 106, 108 can be generated by partitioning the spectrum of the original matched filter into M sub-spectrums, where M is a positive integer greater than one. Frequency components outside of the sub-spectrum of an individual matched filter are substantially attenuated or, in certain cases, eliminated resulting in a band limited matched filter. In this way, each matched filter 102, 104, 106, 108 is responsive to a portion of the signal spectrum of the channel. This band limiting is repeated for all M matched filters.

The received signal is filtered by each matched filter 102, 104, 106, 108 where each matched filter partitions the received signal into its respective filter frequency sub-spectrum. The outputs of the matched filters 102, 104, 106, 108 are combined together in a combiner 110 to produce a combined output 114. It should be recognized that in some embodiments the combiner 110 includes the application of weighting factors to each matched filter output prior to combining the outputs. The matched filter outputs may be combined in a variety of ways to produce the combined output for use in signal detection. One of these techniques can use a summer (not shown). It should be noted that the present disclosure is not limited to a combiner which sums its inputs or to the use of a combiner which applies one or more weighting factors to the matched filter outputs before combining. Any number of other combining methods may be used to produce the combined output 114.

The received signal is also passed through an energy detector 112. For example, the energy detector 112 in a discrete implementation computes the energy over the same N samples of the waveform input into the matched filters which produce the nth combined output, where N is the number of matched filter taps. The received signal is detected in a signal detector 115 using the combined output 114 and the output of the energy detector 112. The signal detector 115 is then used to detect the received signal by a variety of methods known to those skilled in the art. By way of example, the received signal may be detected by comparing the combined output 114 of the combiner 110 against the energy detected at the output of the energy detector 112. The function of the signal detector 115 is to declare a signal detection when the combined output 114 of the combiner 110 is greater than or equal to the output of the energy detector 112 which has been scaled by a threshold. It will be obvious to those skilled in the art that this process is the same as dividing the combined output 114 of the combiner 110 with the output of the energy detector 112 and comparing the result with the threshold, where a signal detection is signaled when the division result is greater than or equal to the threshold.

Figure 2:
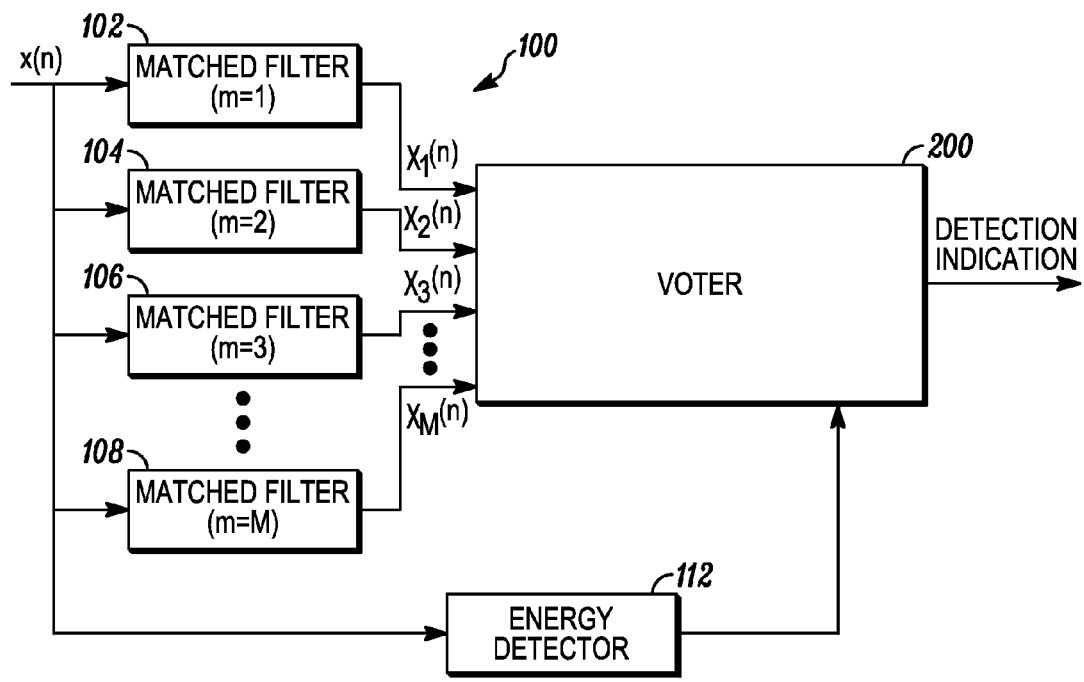
FIG. 2 is a block diagram of a system for improving signal detection in a frequency selective fading channel in a receiver in accordance with an alternative embodiment of the disclosure.

In an alternative embodiment, as illustrated in FIG. 2, a voter 200 replaces the combiner 110 and signal detector 115 in FIG. 1. In this embodiment, the voter 200 declares detection when at least n number of matched filter outputs is greater than the output of the energy detector which has been scaled by the threshold, where n is an integer greater than or equal to one. It should be noted that the present invention is not limited to any particular topology, but rather individuals skilled in the art will appreciate that other combinations and/or variations are possible and still remain within the spirit and scope of the invention.

By creating multiple matched filters 102, 104, 106, 108 with bandwidths smaller than the bandwidth of the channel, frequency diversity is achieved. Due to the uncorrelated nature of frequency selective fading, a fade that affects part of the signal bandwidth will have little effect on the matched filters whose spectra do not occupy the same spectrum as the fade. Since the matched filters 102, 104, 106, 108 are unaffected by the fade, they will produce large output magnitudes resulting in an increased likelihood of detection.

Figure 3:
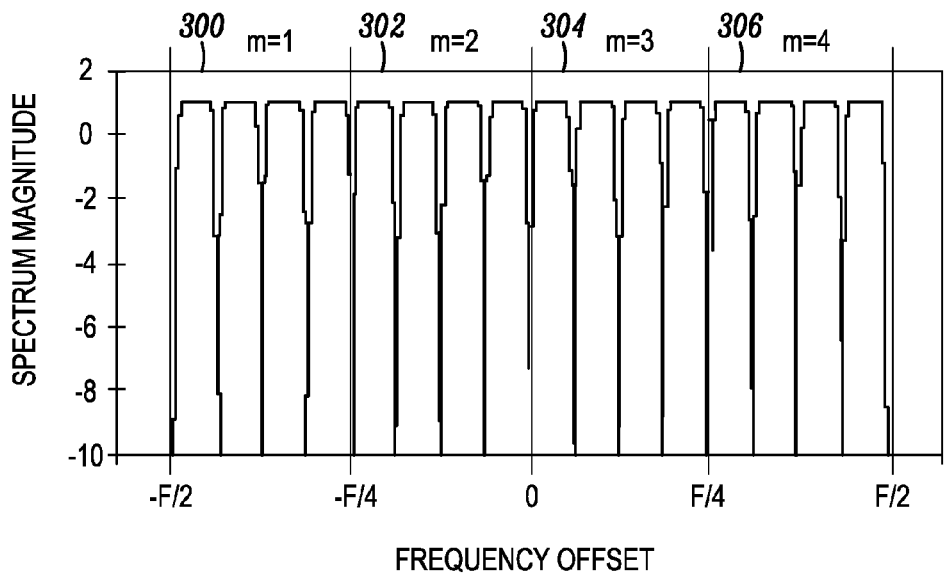
FIG. 3 is a graph illustrating an exemplary received signal spectrum as a plot of spectrum magnitude versus frequency offset in accordance with an embodiment of the disclosure.

FIG. 3 illustrates the exemplary filter spectrum of bandwidth F as a plot of spectrum magnitude versus frequency offset. The exemplary spectrum is partitioned in this example into four sub-spectrums 301, 302, 303, 304 corresponding to m=1, m=2, m=3, and m=4, to which in this example, four matched filters will be applied. The depicted partitioning of the filter spectrum into four sub-spectrums was chosen to facilitate the discussion of an exemplary embodiment of the disclosure in which no way should it be considered limiting. As noted herein, the number of sub-spectrums may be any positive integer greater than one.

Figure 4:
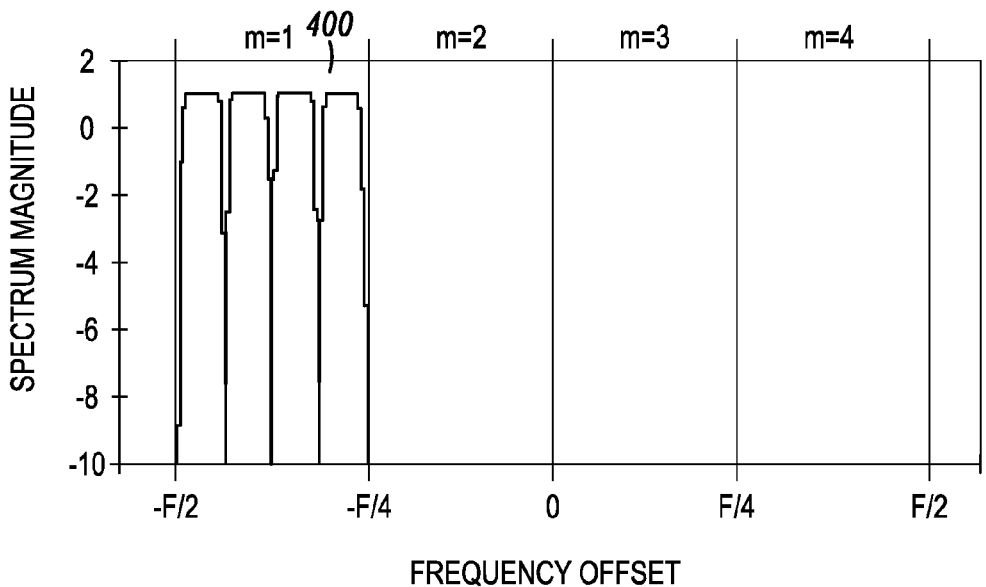
FIG. 4 is a graph illustrating an exemplary frequency partitioned filter spectrum for an m=1 matched filter in accordance with an embodiment of the disclosure.

FIG. 4 illustrates the frequency partitioned filter spectrum 400 of FIG. 3 for the m=1 matched filter. The matched filter bandwidths are chosen to be less than the bandwidth of the single matched filter from which they are derived. Sub-carriers outside the chosen bandwidth of each matched filter are substantially attenuated, or in certain cases, eliminated or "zeroed." The output of each individual matched filter is combined at the combiner 110.

Figure 5:
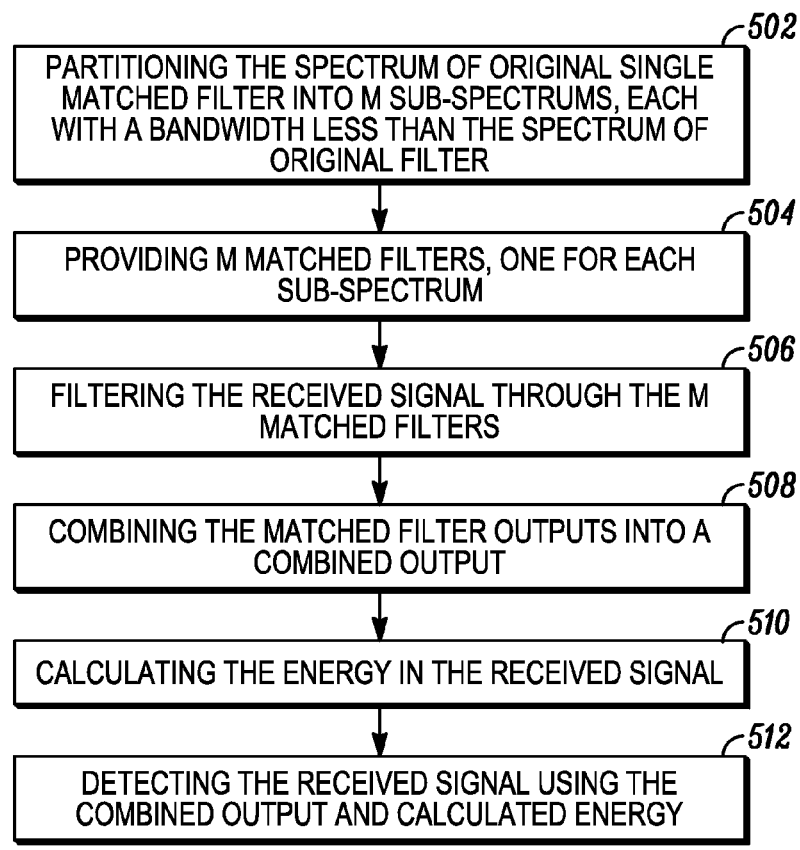
FIG. 5 is a block diagram illustrating a method of mitigating the effect of frequency selective fading on the detection of a received signal on a channel by splitting a single matched filter into a set of multiple matched filters whose bandwidths are less than the bandwidth of the channel in accordance with an embodiment of the disclosure.

Referring now to FIG. 5, the method of mitigating the effect of frequency selective fading on the detection of a signal in a fading channel is illustrated where a single matched filter is split into a set of multiple matched filters whose bandwidths are less than the signal bandwidth. The spectrum of the original single matched filter is partitioned into M matched sub-spectrums 502 by frequency such that the bandwidth of each matched filter is less than the bandwidth of the original single matched filter. To provide the matched filter for any sub-spectrum of the original single matched filter in 504, the magnitude of the single matched filter bandwidth that is not part of the sub-spectrum is substantially attenuated or, in some cases, is eliminated and/or set to zero. The received signal is then filtered through the M matched filters 506. The outputs of the matched filter are then combined 508 into a single combined output. The energy in the portion of the received signal being match filtered is next calculated 510 and the combined output and energy in the received signal are used to detect the received signal 512. The received signal may be detected 512 in the combined output using a variety of methods known in the art. For example, one method of detecting the received signal as set forth in the detecting step 512 is by comparing the energy in the received signal as in the calculating step 510 to the combined output in the combining step 508.

Accordingly, there has been provided a system and method for providing enhanced signal detection on frequency selective fading channels of a wireless communications system. The disclosure is incorporated into a receiver which is in multi-carrier wireless communication with a transmitter where the receiver comprises a plurality of matched filters, each filter partitioning the spectrum into unique sub-spectrums, wherein the receiver further comprises a means of combining the output signals of the matched filter to achieve a combined output. The matched filters of the present disclosure result in a reduction in the signal miss rate as well as an error reduction improvement for error rate performance.

In the foregoing specification, specific embodiments of the present disclosure have been described. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

We claim:

1. A method for enhancing a detection of a received signal in a channel comprising the steps of:
    defining a plurality of matched filters, wherein each matched filter has a bandwidth, and the bandwidth of each matched filter is aggregated to substantially equal and span a bandwidth known a priori;
    filtering the received signal through the plurality of matched filters, wherein each matched filter substantially attenuates portions of the received signal that fall outside its bandwidth;
    calculating an output of each matched filter to detect the received signal;
    summing the matched filter outputs into a combined output;
    determining an energy in a portion of the received signal that is being matched filtered;
    computing a scaled energy by multiplying the determined energy with a threshold; and
    detecting the received signal using the combined output and the scaled energy.

2. The method of claim 1, wherein summing the matched filter outputs into the combined output comprises:
    applying a weighting factor to each matched filter output; and
    summing each weighted matched filter output into a weighted combined output.

3. The method of claim 1, wherein detecting the received signal using the combined output and the scaled energy comprises:
    identifying a number of matched filter outputs that is greater than or equal to the scaled energy;
    determining a number of matched filter outputs needed to declare a detection of the received signal; and
    declaring detection of the received signal when the number of identified matched filtered outputs that is greater than or equal to the scaled energy is greater than or equal to the number of matched filter outputs needed to declare the detection.

4. The method of claim 1, wherein the step of filtering the received signal comprises each matched filter zeroing subcarriers outside its respective bandwidth.

5. The method of claim 1, wherein the bandwidth known a priori is substantially equivalent to a bandwidth of the channel.

6. The method of claim 1, wherein the bandwidth known a priori is substantially equivalent to a bandwidth of a known signal.

7. The method of claim 1, wherein the bandwidth known a priori is substantially equivalent to a bandwidth of a transmitted signal.

8. The method of claim 1, wherein the bandwidth of each of the matched filters is substantially of equal value.

9. The method of claim 1, wherein the bandwidth of each matched filter differs.

10. A receiver for enhancing signal detection in a channel in a multi-carrier modulation communication system comprising:
    a plurality of matched filters each having a bandwidth that is based on a bandwidth known a priori, and wherein each of the plurality of matched filters responds to a unique portion of the bandwidth known a priori where the bandwidth of each matched filter is less than the bandwidth known a priori and the bandwidth of each matched filter is aggregated to substantially equal and span the frequency spectrum of the bandwidth known a priori, and wherein the plurality of matched filters filter a received signal such that each matched filter substantially attenuates portions of the received signal that fall outside of its bandwidth;
    a processor for calculating an output of each of the matched filters to detect the received signal;
    a combiner for summing the matched filter outputs into a combined output;
    a first detector for detecting the received signal in the combined output; and
    a second detector for determining energy in the received signal that is being matched filtered.

11. The receiver of claim 10, wherein the received signal is applied to an input of at least one of the matched filters.

12. The receiver of claim 10, wherein the bandwidth known a priori is substantially equivalent to a bandwidth of the channel.

13. The receiver of claim 10, wherein the bandwidth known a priori is substantially equivalent to a bandwidth of a known signal.

14. The receiver of claim 10, wherein the bandwidth known a priori is substantially equivalent to a bandwidth of a transmitted signal.

15. The receiver of claim 10, wherein the bandwidth of each of the matched filters is substantially of equal value.

16. The receiver of claim 10, wherein the bandwidth of each matched filter differs.

\* \* \* \* \*

UNITED STATES PATENT AND TRADEMARK OFFICE
CERTIFICATE OF CORRECTION

PATENT NO.        : 7,876,864 B2                                              Page 1 of 1
APPLICATION NO.   : 11/743848
DATED             : January 25, 2011
INVENTOR(S)       : Conrad et al.

It is certified that error appears in the above-identified patent and that said Letters Patent is hereby corrected as shown below:

On the Title page

1. Item (75) under "Inventors", Line 1, delete "St. Charles," and insert
-- Geneva, --, therefor.

Signed and Sealed this
Eleventh Day of October, 2011

David J. Kappos
*Director of the United States Patent and Trademark Office*